US011569735B2

(12) United States Patent
Shimizu et al.

(10) Patent No.: US 11,569,735 B2
(45) Date of Patent: Jan. 31, 2023

(54) POWER SUPPLY SYSTEM AND POWER SUPPLY DEVICE

(71) Applicant: Yokogawa Electric Corporation, Musashino (JP)

(72) Inventors: Yuusuke Shimizu, Musashino (JP); Kei Fukuhara, Musashino (JP); Iwao Nakanishi, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/700,594

(22) Filed: Mar. 22, 2022

(65) Prior Publication Data
US 2022/0320996 A1   Oct. 6, 2022

(30) Foreign Application Priority Data

Mar. 31, 2021   (JP) .............................. JP2021-058966

(51) Int. Cl.
*H02M 1/32* (2007.01)
*H02J 1/10* (2006.01)
*H02M 1/00* (2006.01)

(52) U.S. Cl.
CPC ............. *H02M 1/325* (2021.05); *H02J 1/102* (2013.01); *H02J 1/106* (2020.01); *H02M 1/0077* (2021.05)

(58) Field of Classification Search
CPC .................................................... H02M 1/325
See application file for complete search history.

(56) References Cited

U.S. PATENT DOCUMENTS

| 6,301,133 | B1 | 10/2001 | Cuadra et al. | |
| 8,084,885 | B1* | 12/2011 | Zansky | H02J 1/10 |
| | | | | 307/60 |
| 10,069,407 | B1* | 9/2018 | Ku | H05K 7/1492 |
| 2007/0007519 | A1 | 1/2007 | Durbaum | |
| 2013/0321967 | A1* | 12/2013 | Muneyasu | H02H 3/00 |
| | | | | 361/88 |
| 2017/0207780 | A1* | 7/2017 | Chen | H03K 17/687 |
| 2020/0303922 | A1 | 9/2020 | Fukuhara et al. | |

FOREIGN PATENT DOCUMENTS

JP   2020-156224 A   9/2020

* cited by examiner

*Primary Examiner* — Adi Amrany
*Assistant Examiner* — Esayas G Yeshaw
(74) *Attorney, Agent, or Firm* — WHDA, LLP

(57) ABSTRACT

A power supply system includes at least two power supply devices that supply a current to a load. Each of the at least two power supply devices includes a converter configured to generate a current that is to be supplied to the load, an FET that is connected in series between the converter and the load, a gate voltage monitoring circuit configured to monitor whether a gate voltage of the FET has fallen below a predetermined first reference voltage, and an alarm generation circuit configured to generate an alarm according to a result of monitoring by the gate voltage monitoring circuit.

14 Claims, 3 Drawing Sheets

POWER SUPPLY SYSTEM AND POWER SUPPLY DEVICE

BACKGROUND

Field of the Invention

The present invention relates to a power supply system and a power supply device.

Priority is claimed on Japanese Patent Application No. 2021-058966, filed on Mar. 31, 2021, the contents of which are incorporated herein by reference.

Description of Related Art

In general, a power supply that requires high reliability often has a redundant configuration in which a plurality of power supply devices are connected in parallel to a load so that power supply can be continued even if some kind of failure occurs. For example, a power supply for industrial equipment that requires high reliability often has a duplicate power supply device for a load. Japanese Unexamined Patent Application Publication No. 2020-156224 discloses a power supply system in which two power supply devices connected to a load are matched via a matching field effect transistor (FET).

Incidentally, in the conventional power supply system disclosed in Japanese Unexamined Patent Application Publication No. 2020-156224, even if the matching FET is turned off due to, for example, a failure of a control circuit that performs gate control on the matching FET, this state cannot be detected. For this reason, there has been a problem that an alarm cannot be issued in a state where an alarm should be issued.

SUMMARY

A power supply system may include at least two power supply devices that supply a current to a load. Each of the at least two power supply devices may include a converter configured to generate a current that is to be supplied to the load, an FET (Field Effect Transistor) that is connected in series between the converter and the load, a gate voltage monitoring circuit configured to monitor whether a gate voltage of the FET has fallen below a predetermined first reference voltage, and an alarm generation circuit configured to generate an alarm according to a result of monitoring by the gate voltage monitoring circuit.

Further features and aspects of the present disclosure will become apparent from the following detailed description of exemplary embodiments with reference to the attached drawings.

DETAILED DESCRIPTION OF THE INVENTION

Figure 1:
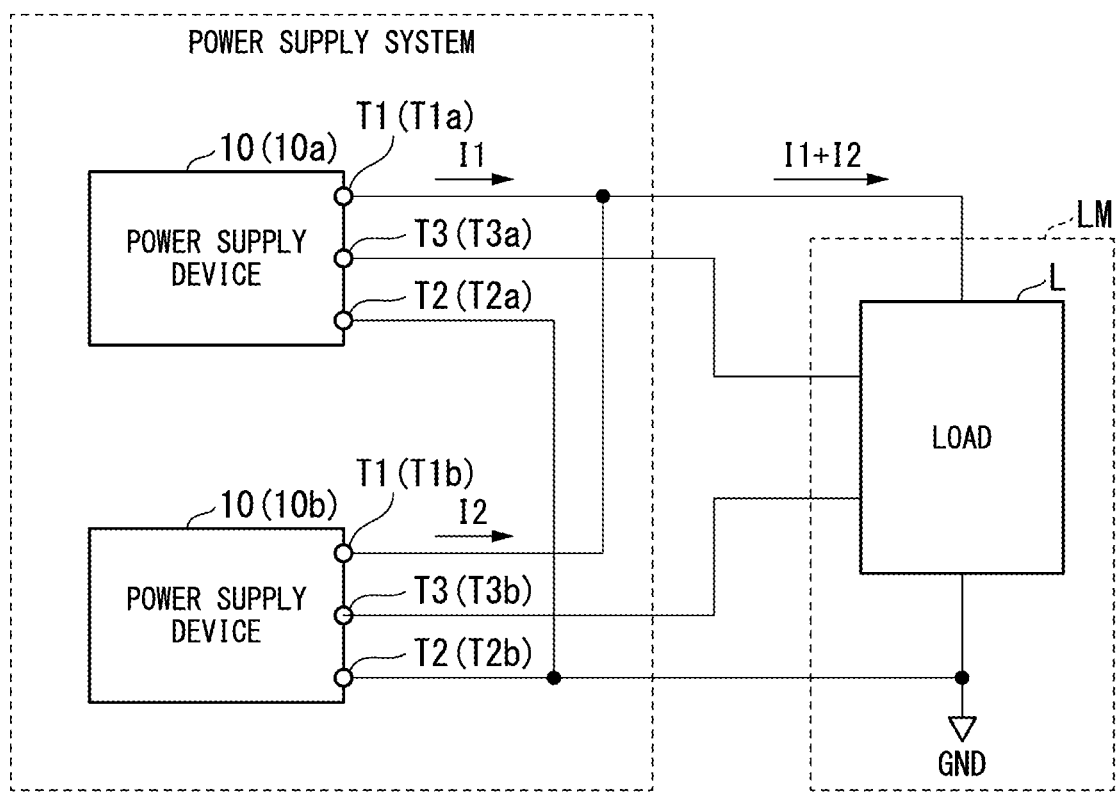
FIG. 1 is a block diagram which shows an overall configuration of a power supply system according to an embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a power supply system and a power supply device that can issue an alarm when a matching FET is turned off.

Hereinafter, a power supply system and a power supply device according to an embodiment of the present invention will be described in detail with reference to the drawings. In the following description, an outline of the embodiment of the present invention will be described first, and then details of the embodiment of the present invention will be described.

[Outline]

An embodiment of the present invention makes it possible to issue an alarm when a matching FET is turned off. Specifically, it is monitored whether a gate voltage of the matching FET has fallen below a predetermined first reference voltage, and an alarm is generated according to a result of the monitoring.

A power supply that requires high reliability (for example, a power supply for industrial equipment) often has a redundant configuration in which a plurality of power supply devices (for example, two) are connected in parallel to a load. Such a power supply has a function of issuing an alarm when there is a decrease in output voltage. By such an alarm being issued, a user can know that an abnormality has occurred in the power supply.

For example, in a power supply system in which two power supply devices are matched via a matching diode, an alarm generation circuit that issues an alarm when an internal voltage of the power supply devices has fallen below a predetermined reference voltage is provided in each of the power supply devices. The internal voltage of the power supply devices described above is specifically an output voltage of a converter that generates a current to be supplied to a load.

Japanese Unexamined Patent Application Publication No. 2020-156224 discloses a power supply system in which two power supply devices are matched using the matching FET instead of the matching diode. In such a power supply system, gate control of the matching FET is performed to limit the reverse current. Here, when the matching FET is turned off due to a failure of a control circuit that performs the gate control of the matching FET, the output voltage of the power supply device (a voltage applied to a load) decreases even if the output voltage of the converter is normal. This is because the voltage decreases by a forward voltage of a body diode because a current is output via the body diode when the matching FET is turned off.

When the matching FET is turned off, the output voltage of the power supply device decreases, but the internal voltage of the power supply device (the output voltage of the converter) is normal, and therefore an alarm is not issued by the alarm generation circuit described above. Here, when the output voltage of the power supply device is directly detected, it may be possible to detect a decrease in the output voltage of the power supply device. However, since the matching FETs provided in the two power supply devices have a common drain electrode, the detected voltage is the output voltage of a normal power supply device in which the FET is not turned off. For this reason, it is not possible to detect the output voltage of an abnormal power supply device in which the FET is turned off.

In the embodiment of the present invention, each of at least two power supply devices provided in the power supply system is as follows. A gate voltage monitoring circuit for monitoring whether the gate voltage of the matching FET connected in series between the converter and the load has fallen below the predetermined first reference voltage is provided to generate an alarm according to a result of the monitoring by the gate voltage monitoring circuit. As a result, an alarm can be issued when the matching FET is turned off.

[Details]

FIG. 1 is a block diagram which shows an overall configuration of the power supply system according to the embodiment of the present invention. As shown in FIG. 1, a power supply system 1 of the present embodiment includes power supply devices 10a and 10b connected in parallel to a load L of a load module LM. In the following description, when it is not necessary to distinguish between these two power supply devices 10a and 10b, they are referred to as a "power supply device 10."

The power supply device 10a includes an output terminal T1a, a ground terminal T2a, and an alarm terminal T3a. The power supply device 10b includes an output terminal T1b, a ground terminal T2b, and an alarm terminal T3b. In the following description, when it is not necessary to distinguish between the output terminals T1a and T1b, they are referred to as an "output terminal T1," and when it is not necessary to distinguish between the ground terminals T2a and T2b, they are referred to as a "ground terminal T2." Moreover, when it is not necessary to distinguish between the alarm terminals T3a and T3b, they are referred to as an "alarm terminal T3."

The output terminal T1a of the power supply device 10a and the output terminal T1b of the power supply device 10b are connected to one end of the load L, and the ground terminal T2a of the power supply device 10a and the ground terminal T2b of the power supply device 10b are connected to the other end (a grounded terminal) of the load L. In addition, the alarm terminal T3a of the power supply device 10a and the alarm terminal T3b of the power supply device 10b are individually connected to the load L.

As shown in FIG. 1, a current supplied from the power supply device 10a to the load L (a current output from the output terminal T1a) is I1, and a current supplied from the power supply device 10b to the load L (a current output from the output terminal T1b) is I2. A current supplied from the power supply system 1 to the load L is a current (I1+I2) which is a sum of the current I1 supplied from the power supply device 10a to the load L and the current I2 supplied from the power supply device 10b to the load L.

Since the power supply system 1 includes two power supply devices 10 connected in parallel to the load L, even if one power supply device 10 (for example, the power supply device 10a) fails, a current is supplied from the other power supply device (for example, the power supply device 10b) to the load L. For this reason, a current supply to the load L is continued as an entirety of the power supply system 1.

Figure 2:
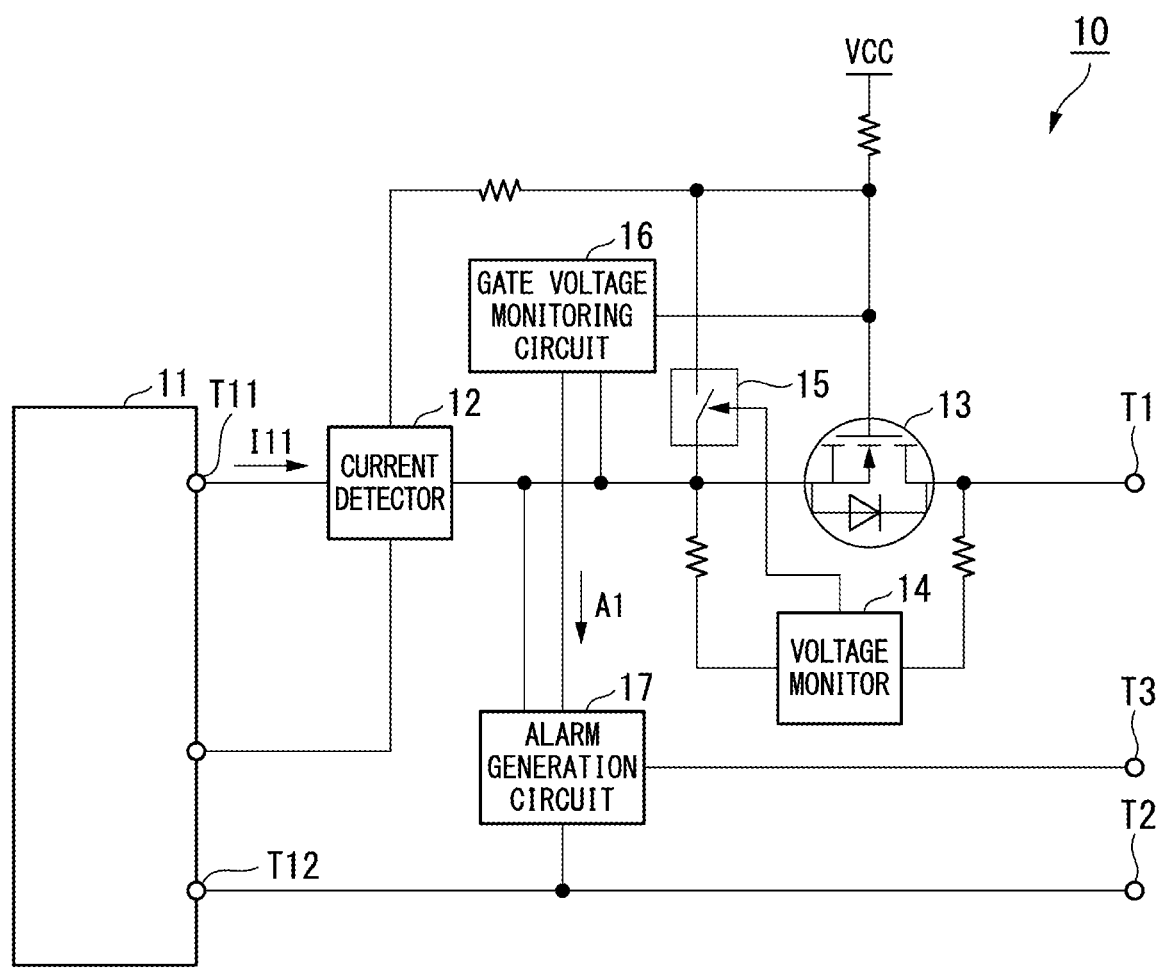
FIG. 2 is a block diagram which shows an internal configuration of the power supply device according to the embodiment of the present invention.

FIG. 2 is a block diagram which shows an internal configuration of a power supply device according to an embodiment of the present invention. As shown in FIG. 2, the power supply device 10 includes a converter 11, a current detector 12, a matching FET 13 (FET), a voltage monitor 14, a switching element 15, a gate voltage monitoring circuit 16, and an alarm generation circuit 17.

The converter 11 has a converter output terminal T11 and a converter ground terminal T12, and generates a current I11 to be supplied to the load L. The converter 11 outputs the generated current I11 from the converter output terminal T11 to the output terminal T1.

The current detector 12 is connected to the converter output terminal T11 and detects the current I11 output from the converter output terminal T11. In addition, the current detector 12 controls the gate voltage of the matching FET 13 to limit a reverse current when the reverse current from the matching FET 13 to the converter 11 is detected.

The matching FET 13 is connected between the current detector 12 and the output terminal T1 and controls a current flowing between the converter output terminal T11 and the output terminal T1. Specifically, in the matching FET, the gate electrode is connected to a power supply (VCC) via a resistor, the source electrode is connected to the current detector 12, and the drain electrode is connected to the output terminal T1.

The matching FET 13 is, for example, an n-channel metal oxide semiconductor FET (MOSFET), but is not limited to this. The matching FET 13 has a body diode. The matching FET 13 is connected such that a forward direction of the body diode and a direction in which the current I11 flows from the converter 11 to the load L match each other.

The voltage monitor 14 detects a voltage between the drain electrode and the source electrode of the matching FET 13. The voltage monitor 14 turns the switching element 15 on or off on the basis of a result of the detection of a voltage. The voltage monitor 14 performs such control to obstruct a reverse current from the output terminal T1 to the converter output terminal T11.

The switching element 15 is connected between the gate electrode and the source electrode of the matching FET 13, and causes the source electrode and the gate electrode of the matching FET 13 to be short-circuited or opened under control of the voltage monitor 14. When the switching element 15 is turned on, the source electrode and the gate electrode of the matching FET 13 are short-circuited, and, when the switching element 15 is turned off, a VCS potential is applied to the source electrode of the matching FET 13 and the FET 13 is turned on.

In the present embodiment, the voltage monitor 14 controls the switching element 15 to set the FET 13 to be short-circuited or opened, but, a method of setting the FET 13 to be short-circuited or opened is not limited to a method of controlling the switching element 15. For example, the switching element 15 may be omitted, and the voltage monitor 14 may directly control the gate voltage of the FET 13 to set the FET 13 to be short-circuited or opened.

The gate voltage monitoring circuit 16 monitors whether the gate voltage of the matching FET 13 has fallen below a predetermined reference voltage (a first reference voltage). That is, the gate voltage monitoring circuit 16 monitors whether the matching FET 13 is turned off. The gate voltage monitoring circuit 16 outputs an alarm signal A1 indicating that an alarm is generated to the alarm generation circuit 17 when the gate voltage of the matching FET 13 has fallen below the reference voltage described above.

Here, the reference voltage described above is set to a value that can guarantee, for example, an ID of 1 [mA] or less according to gate-source voltage (VGS) and ID (drain current) characteristics of the matching FET 13. It is desirable that the gate voltage monitoring circuit 16 include a circuit that performs signal processing of a low-pass filter on the gate voltage. By monitoring the gate voltage on which signal processing is performed by such a circuit, it is possible to prevent malfunction due to noise.

Figure 3:
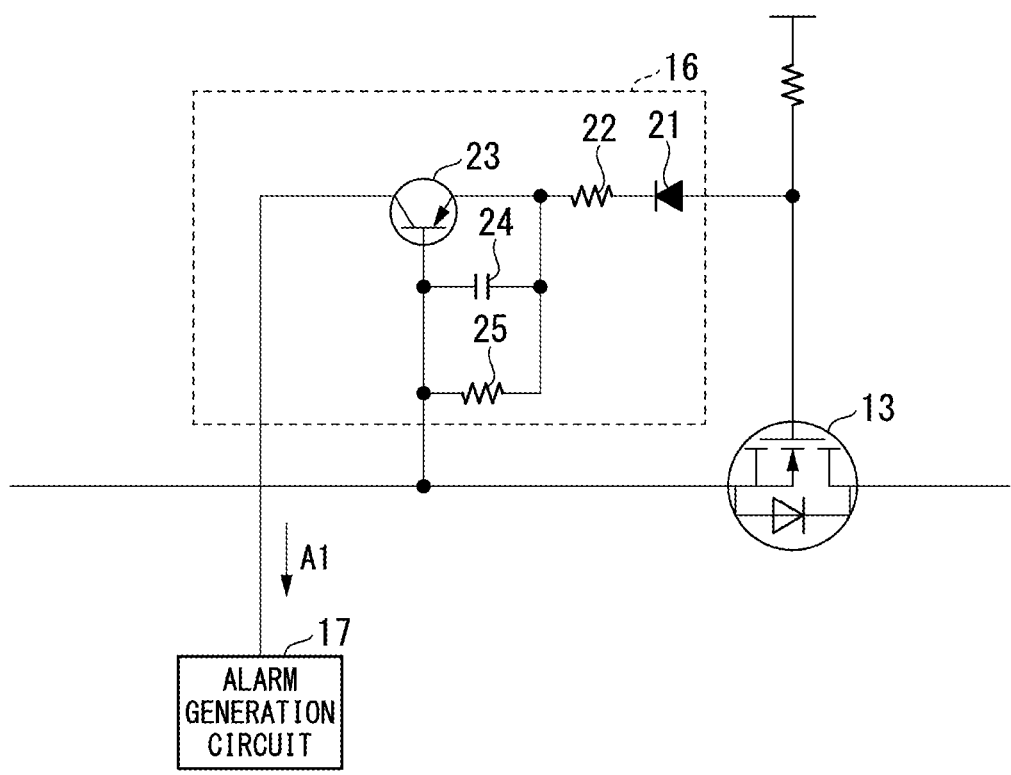
FIG. 3 is a circuit diagram which shows an example of a gate voltage monitoring circuit provided in the power supply device according to the embodiment of the present invention.

FIG. 3 is a circuit diagram which shows an example of a gate voltage monitoring circuit provided in the power supply device according to the embodiment of the present invention. As shown in FIG. 3, the gate voltage monitoring circuit 16 includes a diode 21, a resistor 22, a transistor 23, a capacitor 24, and a resistor 25. In the diode 21, the anode electrode is connected to the gate electrode of the matching FET 13, and the cathode electrode is connected to one end of the resistor 22. The one end of the resistor 22 is connected to the cathode electrode of the diode 21, and the other end is connected to an emitter electrode of the transistor 23.

The transistor 23 is, for example, a PNP-type bipolar transistor. The transistor 23 has an emitter electrode connected to the other end of the resistor 22, an base electrode connected to the source electrode of the matching FET 13, and a collector electrode connected to the alarm generation circuit 17. The capacitor 24 and the resistor 25 are connected between the emitter electrode and the base electrode of the transistor 23.

In the gate voltage monitoring circuit 16 shown in FIG. 3, when the gate voltage of the matching FET 13 does not fall below the reference voltage described above, the transistor 23 is turned on. As a result, a signal of an "H (high) level" is output from the gate voltage monitoring circuit 16 to the alarm generation circuit 17. On the other hand, when the gate voltage of the matching FET 13 has fallen below the reference voltage described above, the transistor 23 is turned off. As a result, a signal of an "L (low) level" (an alarm signal A1) is output from the gate voltage monitoring circuit 16 to the alarm generation circuit 17.

The alarm generation circuit 17 is connected between an output end of the current detector 12 (the source electrode of the matching FET 13) and the converter ground terminal T12, and monitors a converter output voltage. The alarm generation circuit 17 generates an alarm (a second alarm) when the converter output voltage has fallen below a predetermined reference voltage (a second reference voltage). The alarm generated by the alarm generation circuit 17 is output to the load L via the alarm terminal T3. The alarm generation circuit 17 monitors a voltage obtained by subtracting a voltage decrease in the current detector 12 from the output voltage of the converter.

In addition, the alarm generation circuit 17 generates an alarm (a first alarm) even when the alarm signal A1 described above is output from the gate voltage monitoring circuit 16. The alarm generated by the alarm generation circuit 17 is output to the load L via the alarm terminal T3.

Here, the alarm generation circuit 17 may output the alarm (the second alarm) according to the converter output voltage and the alarm (the first alarm) according to the alarm signal A1 as the same alarm, or may output them as different alarms. When the former alarm is issued, a user can know that some abnormality has occurred in the power supply device 10. On the other hand, when the latter alarm is issued, the user can know a type of abnormality (abnormality of the converter output voltage or abnormality when the matching FET is turned off), in addition to the occurrence of abnormality in the power supply device 10.

As described above, in the present embodiment, the two power supply devices 10 in the power supply system 1 in which the two power supply devices 10 (the power supply devices 10a and 10b) connected to the load L are matched via the matching FET 13 are as follows. That is, the gate voltage monitoring circuit 16 for monitoring whether the gate voltage of the matching FET 13 has fallen below a predetermined reference voltage (the first reference voltage) is provided, and an alarm generation circuit 17 generates an alarm according to a result of the monitoring of the gate voltage monitoring circuit 16. As a result, an alarm can be issued when the matching FET 13 is turned off.

The power supply system and the power supply device according to the embodiment of the present invention have been described above, but the present invention is not limited to the embodiment described above and can be freely changed within the scope of the present invention. For example, in the embodiment described above, the power supply system 1 is configured to include two power supply devices 10a and 10b connected in parallel to the load L of a load module LM, but the number of power supply devices to be connected in parallel to the load L may be three or more. In addition, in the embodiment described above, the power supply device 10 is configured to include the current detector 12 and the voltage monitor 14, but the power supply device 10 may have a configuration in which either the current detector 12 or the voltage monitor 14 is omitted.

[Supplementary Note]

In order to solve the problems described above, a power supply system according to one aspect of the present invention is a power supply system (1) that may include at least two power supply devices (10) that supply a current to a load (L). Each of the at least two power supply devices may include: a converter (11) configured to generate a current that is to be supplied to the load; an FET (Field Effect Transistor) (13) that is connected in series between the converter and the load; a gate voltage monitoring circuit (16) configured to monitor whether a gate voltage of the FET has fallen below a predetermined first reference voltage; and an alarm generation circuit (17) configured to generate an alarm according to a result of monitoring by the gate voltage monitoring circuit.

In addition, in the power supply system according to the aspect of the present invention, the alarm generation circuit may be configured to also generate an alarm when an output voltage of the converter has fallen below a predetermined second reference voltage.

In addition, in the power supply system according to the aspect of the present invention, the alarm generation circuit may be configured to generate an alarm according to the result of the monitoring by the gate voltage monitoring circuit as a first alarm, and generate an alarm according to the output voltage of the converter as a second alarm.

In addition, in the power supply system according to the aspect of the present invention, the each of the at least two power supply devices may further include a current detector (12) configured to limit a reverse current from the FET to the converter by controlling a gate voltage of the FET when the current detector has detected the reverse current.

In addition, in the power supply system according to the aspect of the present invention, the each of the at least two power supply devices may further include a voltage monitor (14) configured to detect a voltage between a drain electrode and a source electrode of the FET and obstruct a reverse current from the FET to the converter by controlling the FET to an off state based on a result of a detection of the voltage.

In addition, in the power supply system according to the aspect of the present invention, the each of the at least two power supply devices may further include an output terminal (T1) connected to the load, a gate electrode of the FET may be connected to a power supply via a resistor, a source electrode of the FET may be connected to the current detector, and a drain electrode of the FET may be connected to the output terminal.

In addition, in the power supply system according to the aspect of the present invention, the each of the at least two power supply devices may further include a switching element (15) connected between the gate electrode and the source electrode of the FET, and the voltage monitor is configured to obstruct the reverse current by controlling the FET.

A power supply device (10) according to another aspect of the present invention, may include: a converter (11) configured to generate a current that is to be supplied to a load (L); an FET (Field Effect Transistor) (13) that is connected in series between the converter and the load; a gate voltage monitoring circuit (16) configured to monitor whether a gate voltage of the FET has fallen below a predetermined first reference voltage; and an alarm generation circuit (17) configured to generate an alarm according to a result of monitoring by the gate voltage monitoring circuit.

In addition, in the power supply device according to the aspect of the present invention, the alarm generation circuit may be configured to also generate an alarm when an output voltage of the converter has fallen below a predetermined second reference voltage.

In addition, in the power supply device according to the aspect of the present invention, the alarm generation circuit may be configured to generate an alarm according to the result of the monitoring by the gate voltage monitoring circuit as a first alarm, and generate an alarm according to the output voltage of the converter as a second alarm.

In addition, the power supply device according to the aspect of the present invention may further include a current detector (12) configured to limit a reverse current from the FET to the converter by controlling a gate voltage of the FET when the current detector has detected the reverse current.

In addition, the power supply device according to the aspect of the present invention may further include a voltage monitor (14) configured to detect a voltage between a drain electrode and a source electrode of the FET and obstruct a reverse current from the FET to the converter by controlling the FET to an off state based on a result of a detection of the voltage.

In addition, the power supply device according to the aspect of the present invention may further include an output terminal (T1) connected to the load, a gate electrode of the FET may be connected to a power supply via a resistor, a source electrode of the FET may be connected to the current detector, and a drain electrode of the FET may be connected to the output terminal.

In addition, the power supply device according to the aspect of the present invention may further include a switching element (15) connected between the gate electrode and the source electrode of the FET, and the voltage monitor is configured to obstruct the reverse current by controlling the FET.

According to the present invention, it is possible to issue an alarm when a matching FET is turned off.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A power supply system comprising at least two power supply devices that supply a current to a load,
   wherein each of the at least two power supply devices comprises:
   a converter configured to generate a current that is to be supplied to the load;
   an FET (Field Effect Transistor) that is connected in series between the converter and the load;
   a gate voltage monitoring circuit configured to monitor whether a gate voltage of the FET has fallen below a predetermined first reference voltage; and
   an alarm generation circuit configured to generate an alarm according to a result of monitoring by the gate voltage monitoring circuit.

2. The power supply system according to claim 1,
   wherein the alarm generation circuit is configured to also generate an alarm when an output voltage of the converter has fallen below a predetermined second reference voltage.

3. The power supply system according to claim 2,
   wherein the alarm generation circuit is configured to generate an alarm according to the result of monitoring by the gate voltage monitoring circuit as a first alarm, and generate an alarm according to the output voltage of the converter as a second alarm.

4. The power supply system according to claim 1,
   wherein the each of the at least two power supply devices further comprises a current detector configured to limit a reverse current from the FET to the converter by controlling a gate voltage of the FET when the current detector has detected the reverse current.

5. The power supply system according to claim 1,
   wherein the each of the at least two power supply devices further comprises a voltage monitor configured to detect a voltage between a drain electrode and a source electrode of the FET and obstruct a reverse current from the FET to the converter by controlling the FET to an off state based on a result of a detection of the voltage.

6. The power supply system according to claim 4,
   wherein the each of the at least two power supply devices further comprises an output terminal connected to the load, wherein a gate electrode of the FET is connected to a power supply via a resistor,
wherein a source electrode of the FET is connected to the current detector, and
wherein a drain electrode of the FET is connected to the output terminal.

7. The power supply system according to claim 6,
wherein the each of the at least two power supply devices further comprises a switching element connected between the gate electrode and the source electrode of the FET, and
wherein the voltage monitor is configured to obstruct the reverse current by controlling the FET.

8. A power supply device comprises:
a converter configured to generate a current that is to be supplied to a load;
an FET (Field Effect Transistor) that is connected in series between the converter and the load;
a gate voltage monitoring circuit configured to monitor whether a gate voltage of the FET has fallen below a predetermined first reference voltage; and
an alarm generation circuit configured to generate an alarm according to a result of monitoring by the gate voltage monitoring circuit.

9. The power supply device according to claim 8,
wherein the alarm generation circuit is configured to also generate an alarm when an output voltage of the converter has fallen below a predetermined second reference voltage.

10. The power supply device according to claim 9,
wherein the alarm generation circuit is configured to generate an alarm according to the result of monitoring by the gate voltage monitoring circuit as a first alarm, and generate an alarm according to the output voltage of the converter as a second alarm.

11. The power supply device according to claim 8, further comprising:
a current detector configured to limit a reverse current from the FET to the converter by controlling a gate voltage of the FET when the current detector has detected the reverse current.

12. The power supply device according to claim 8, further comprising:
a voltage monitor configured to detect a voltage between a drain electrode and a source electrode of the FET and obstruct a reverse current from the FET to the converter by controlling the FET to an off state based on a result of a detection of the voltage.

13. The power supply device according to claim 11, further comprising:
an output terminal connected to the load,
wherein a gate electrode of the FET is connected to a power supply via a resistor,
wherein a source electrode of the FET is connected to the current detector, and
wherein a drain electrode of the FET is connected to the output terminal.

14. The power supply device according to claim 13, further comprising:
a switching element connected between the gate electrode and the source electrode of the FET,
wherein the voltage monitor is configured to obstruct the reverse current by controlling the FET.

* * * * *